Feb. 23, 1926.
A. B. LEWIS
BIB
Filed Jan. 11, 1922
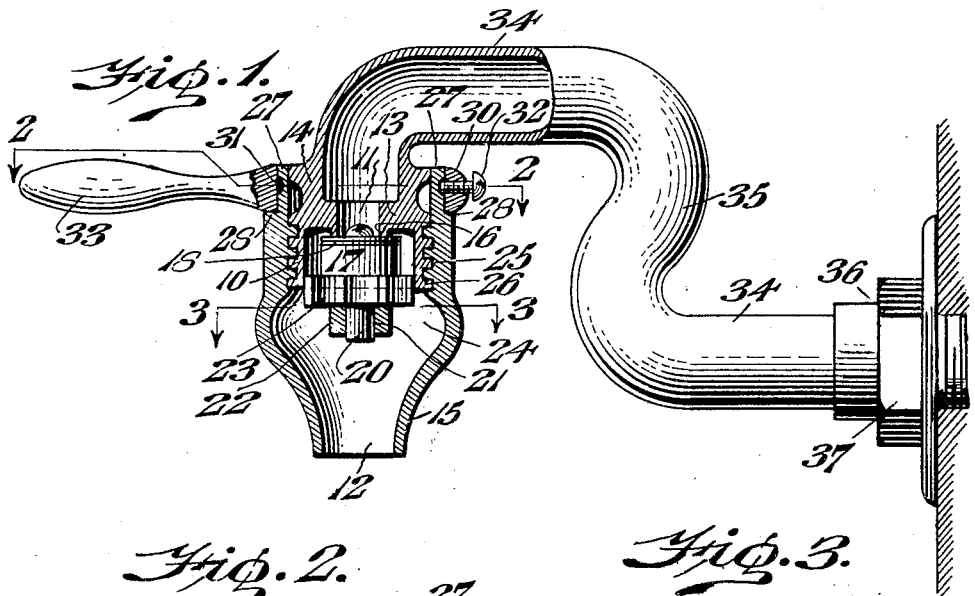
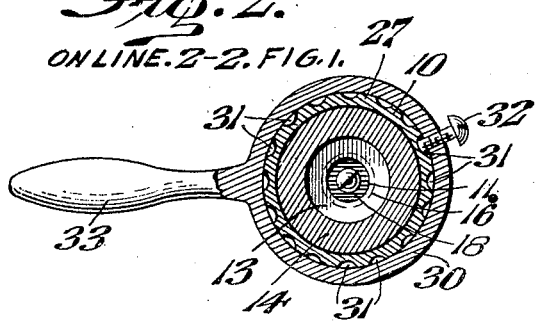
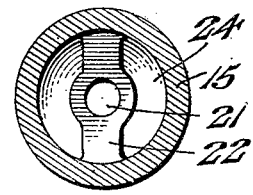
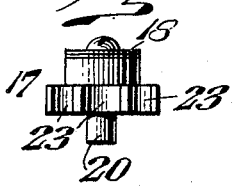
INVENTOR
Alfred B. Lewis.
BY
Robert M. Barr
ATTORNEY Patented Feb. 23, 1926.

1,574,200

UNITED STATES PATENT OFFICE.

ALFRED B. LEWIS, OF PHILADELPHIA, PENNSYLVANIA, ASSIGNOR, BY DIRECT AND MESNE ASSIGNMENTS, TO WILLIAM RUSSELL STOTT, OF PHILADELPHIA, PENNSYLVANIA.

BIB.

Application filed January 11, 1922. Serial No. 528,367.

*To all whom it may concern:*

Be it known that I, ALFRED B. LEWIS, a citizen of the United States, and a resident of Philadelphia, county of Philadelphia, State of Pennsylvania, have invented certain new and useful Improvements in Bibs, of which the following is a specification.

Some of the objects of the present invention are to provide an improved bib or faucet for controlling the flow of water or any other liquid: to provide in a bib of valve construction whereby leakage is effectually prevented when the valve is closed; to provide a bib arranged to break the pressure of the liquid medium and prevent splashing thereof as said medium is discharged from the bib; to provide improved means for taking up or compensating for wear upon the valve parts of a bib or faucet; and to provide other improvements as will hereinafter appear.

In the accompanying drawings, Fig. 1 represents a side elevation, partly in section, of a bib or faucet embodying one form of the present invention: Fig. 2 represents a section on line 2—2 of Fig. 1; Fig. 3 represents a section on line 3—3 of Fig. 1; Fig. 4 represents a side elevation of the valve member; and Fig. 5 represents a plan of the valve member.

Referring to the drawings, one form of the present invention comprises a bib or faucet body 10, of tubular construction having an inlet port 11 and a discharge port 12. In the present construction, the inlet port 11 is formed in a partition 13 extending transversely of a head 14, which forms a fixed part of the body 10, and the discharge port 12 is formed in a nozzle 15 which forms the movable part of the body 10.

For the purpose of controlling the inlet port 11, it is provided at its outer side with an annular flange 16 which forms a seat for a valve member 17 arranged to be moved axially towards and away from the flanged seat 16 according to requirements. The valve member 17 is preferably provided with a removable washer 18 or other leakproof member arranged to seat over the inlet port 11 to cut off the supply of liquid, gas, or any substance adapted to traverse the bib.

In order to maintain the valve member 17 in proper operative relation with respect to the inlet port 11, it is provided with an axially disposed stem 20, arranged for free sliding movement in a guide opening 21 formed in a web 22, which extends transversely within the nozzle body 15, the parts being so arranged as to accurately align the valve member 17 with the inlet port 11.

As a means for permitting the flow of liquid when the valve 17 is open, and also breaking the pressure of the fluid so that it discharges through the nozzle 15 with diminished velocity and a minimum of splashing, the valve member 17 has a diameter slightly less than the inner diameter of the head 14, while its outer periphery is provided with a plurality of through grooves 23, which serve to deliver the liquid to the nozzle 15. In assembled condition the arrangement of the parts is such that the web 22 holds the valve member 17 within the head 14 in both the open and the closed positions of the valve member 17, and as a consequence when the valve 17 is open the incoming column of fluid under pressure impacts against the upper face of the valve member 17, is broken up, and then spreads radially to all the circumferential grooves 23. Leaving the grooves 23 the liquid enters an enlarged, circumferential chamber 24 forming the inlet portion of the nozzle 15, the sides of which converge downward to the discharge port 12.

For controlling the opening and closing of the valve member 17, the upper end of the body of the nozzle 15 is provided with an internal thread 25 arranged for co-operative engagement with an external thread 26 upon the head 14, and has also a cylindrical external neck 27 forming a shoulder 28. A ring 30 is arranged to fit over the neck 27 and seat upon the shoulder 28 with its upper end flush with the upper extremity of the nozzle body 15. The neck 27 is provided with a plurality of circumferentially arranged depressions or holes 31 into any one of which a set screw 32 or the like is arranged to fit to lock the ring 30 in its adjusted position. An extension 33 projects laterally from the ring 30 at a convenient point to form a handle for turning the ring 30 and its associated parts. By this construction it is possible to take up for wear of the valve member 17 by loosening the set screw 32, turning the ring 30 relative to the body 10, and locking it in the new position by setting the screw 32 in another of the openings 31.

In order to reduce the inertia of the moving column of liquid being supplied to the bib, an extension pipe 34 leads from the head 14 and is provided with a reverse bend 35 at a point preferably adjacent to the end where it is joined to the source of supply by means of a threaded end 36. A clamping nut 37 of the flange type is carried by the pipe 34 for anchoring the bib to its fixed support.

It will now be apparent that a complete unitary construction has been provided wherein liquid under pressure can be discharged for use with its pressure so reduced as to cause delivery without splashing and spattering such as takes place in the ordinary type of bib or faucet. This reduction of pressure takes place in part because of the reverse bend in the extension pipe 34 at or near the inlet end thereof, and in part to the spreading action of the valve 17 together with the effect of the enlarged chamber in the nozzle member 15. After expansion in this chamber the liquid passes through the converging nozzle with sufficient velocity to prevent instant spreading and distribution of the liquid in all directions at the outlet port 12.

While but one form in which this invention may be embodied has been here shown, it is to be understood that the invention is not limited to any specific construction, but might be applied in various forms without departing from the spirit of the invention or the scope of the appended claims.

Having now fully described my invention, what I claim is:—

1. In a bib, a head having an inlet port opening into a recess of greater diameter, a valve member arranged to fit within said recess for free sliding movement to open or close said inlet port, a nozzle threaded to said head and having a chamber of larger diameter than said recess located on the discharge side of said valve member and communicating with the outlet of said nozzle, the periphery of said valve member comprising a plurality of axially disposed ribs to provide paths to subdivide the flowing liquid into a plurality of streams, and means cooperating with said head for controlling the movement of said valve member.

2. In a bib, a head having an inlet port opening into a recess of greater diameter, a valve member arranged to open or close said inlet port, and having a part of enlarged diameter fitting within said recess for free sliding movement, a nozzle threaded to said head and having a chamber of larger diameter than said recess located on the discharge side of said valve member and communicating with the outlet of said nozzle, means for actuating said head to control the movement of said valve, the periphery of said enlarged valve member part comprising a plurality of axially disposed ribs to provide paths to subdivide the flowing liquid into a plurality of streams, whereby the flow pressure is reduced and splashing eliminated.

Signed at Philadelphia, county of Philadelphia, State of Pennsylvania, this 7th day of January, 1922.

ALFRED B. LEWIS.